(12) United States Patent
Tian et al.

(10) Patent No.: US 12,425,908 B2
(45) Date of Patent: Sep. 23, 2025

(54) DATA TRANSMISSION METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventors: Wenqiang Tian, Dongguan (CN); Jia Shen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 392 days.

(21) Appl. No.: 17/942,016

(22) Filed: Sep. 9, 2022

(65) Prior Publication Data
US 2023/0007529 A1 Jan. 5, 2023

Related U.S. Application Data

(63) Continuation of application No. PCT/CN2020/078702, filed on Mar. 11, 2020.

(51) Int. Cl.
*H04W 24/10* (2009.01)
*H04W 28/04* (2009.01)

(52) U.S. Cl.
CPC .......... *H04W 24/10* (2013.01); *H04W 28/04* (2013.01)

(58) Field of Classification Search
CPC ..... H04W 24/10; H04W 28/04; H04W 48/02; H04W 48/12
See application file for complete search history.

(56) References Cited

U.S. PATENT DOCUMENTS

| | | | |
|---|---|---|---|
| 7,746,816 B2 | 6/2010 | Attar | |
| 8,514,832 B2 | 8/2013 | Attar | |
| 2004/0179494 A1 | 9/2004 | Attar | |
| 2010/0014487 A1 | 1/2010 | Attar | |
| 2018/0013048 A1* | 1/2018 | Insanic | H10N 10/852 |
| 2018/0124685 A1* | 5/2018 | Jha | H04W 4/70 |

(Continued)

FOREIGN PATENT DOCUMENTS

| | | |
|---|---|---|
| CN | 101089561 A | 12/2007 |
| CN | 101227490 A | 7/2008 |

(Continued)

OTHER PUBLICATIONS

Umesh Phuyal et al: "Controlling access overload and signaling congestion in M2M networks", Asilomar Conference On Signals, Systems and Computers. Conference Record, IEEE Computer Society, US, Nov. 4, 2012 (Nov. 4, 2012), pp. 591-595, XP032350961, ISSN: 1058-6393, DOI: 10.1109/Acssc.2012.6489075, ISBN: 978-1-4673-5050-1.

(Continued)

*Primary Examiner* — Liem H. Nguyen
(74) *Attorney, Agent, or Firm* — Ladas & Parry, LLP

(57) ABSTRACT

A data transmission method is provided. The method comprises: a terminal device receiving first indication information, wherein the first indication information is used to determine whether the terminal device is valid; and the terminal device determining, according to the first indication information, whether to transmit first data. Further disclosed are another data transmission method, an electronic device, and a storage medium.

20 Claims, 14 Drawing Sheets

Receiving, by a terminal device, first indication information, the first indication information being used to determine whether the terminal device is valid — S201

Determining, by the terminal device, whether to transmit first data according to the first indication information — S202

(56) References Cited

U.S. PATENT DOCUMENTS

| | | | |
|---|---|---|---|
| 2019/0014492 A1* | 1/2019 | Kim | H04L 5/0053 |
| 2019/0372644 A1* | 12/2019 | Chen | H04W 24/02 |
| 2020/0077321 A1* | 3/2020 | Shi | H04W 76/14 |
| 2020/0412417 A1* | 12/2020 | Calzolari | G06N 3/084 |
| 2022/0217556 A1* | 7/2022 | Rydén | H04B 17/318 |
| 2023/0016595 A1* | 1/2023 | Rydén | G01S 5/0036 |

FOREIGN PATENT DOCUMENTS

| | | |
|---|---|---|
| CN | 101959159 A | 1/2011 |
| WO | 2021017191 A1 | 2/2021 |

OTHER PUBLICATIONS

Ferdouse Lilatul et al: "Congestion and overload control techniques in massive M2M systems: a survey : L. Ferdouse, A. Anpalagan and s. Misra", Transactions on Emerging Telecommunications Technologies, [Online], vol. 28, No. 2, Mar. 27, 2015 (Mar. 27, 2015), p. e2936, XP093033495, GB ISSN: 2161-3915, DOI: 10.1002/ett.2936.

Hussain Fatima et al: "Medium access control techniques in M2M communication: survey and critical review : F. Hussain, A. Anpalagan and R. Vannithamby", Transactions on Emerging Telecommunications Technologies, [Online], vol. 28, No. 1, Sep. 30, 2014 (Sep. 30, 2014), p. e2869, XP093033325, GB ISSN: 2161-3915, DOI: 10.1002/ett.2869.

Supplementary European Search Report in corresponding European patent application No. 20923834.4, mailed on Mar. 29, 2023.

International Search Report in the international application No. PCT/CN2020/078702, mailed on Dec. 2, 2020, and its English Translation provided by WIPO.

The Written Opinion of the International Search Authority in the international application No. PCT/CN2020/078702, mailed on Dec. 2, 2020, and its English Translation provided by Google Translate.

* cited by examiner

Sending, by a network device, first indication information, the first indication information being used to determine whether a terminal device is valid — S301

FIG. 10

DATA TRANSMISSION METHOD, ELECTRONIC DEVICE, AND STORAGE MEDIUM

CROSS-REFERENCE TO RELATED APPLICATION

This is a continuation application of International Patent Application No. PCT/CN2020/078702, filed on Mar. 11, 2020, entitled "DATA TRANSMISSION METHOD, ELECTRONIC DEVICE, AND STORAGE MEDIUM", the disclosure of which is hereby incorporated by reference in its entirety.

BACKGROUND

In the related technology, when multiple terminal devices transmit data to a network device, the problem of poor data transmission quality may be caused.

SUMMARY

The disclosure relates to the technical field of wireless communication, in particular to a method for transmitting data, an electronic device and a storage medium.

According to a first aspect of the disclosure, in an embodiment, there is provided a method for transmitting data, which includes the following operations: a terminal device receives first indication information, the first indication information being used to determine whether the terminal device is valid; the terminal device determines whether to transmit first data according to the first indication information.

According to a second aspect of the disclosure, in an embodiment, there is provided a method for transmitting data, which includes the following operation: a network device sends first indication information, the first indication information being used to determine whether the terminal device is valid.

According to a third aspect of the disclosure, in an embodiment, there is provided a terminal device, which includes a receiving unit and a processing unit. The receiving unit is configured to receive first indication information, the first indication information being used to determine whether the terminal device is valid.

The processing unit is configured to determine whether to transmit first data according to the first indication information.

According to a fourth aspect of the disclosure, in an embodiment, there is provided a network device, which includes a sending unit. The sending unit is configured to send first indication information, the first indication information being used to determine whether the terminal device is valid.

According to a fifth aspect of the disclosure, in an embodiment, there is provided a terminal device, which includes a processor and a memory for storing a computer program capable of running on the processor. The processor is configured to execute the computer program to implement the operations of the above method for transmitting data performed by the terminal device.

According to a sixth aspect of the disclosure, in an embodiment, there is provided a network device, which includes a processor and a memory for storing a computer program capable of running on the processor. The processor is configured to execute the computer program to implement the operations of the above method for transmitting data performed by the network device.

According to a seventh aspect of the disclosure, in an embodiment, there is provided a chip including a processor for calling and executing a computer program in a memory, which causes a device equipped with the chip to implement the above method for transmitting data performed by the terminal device.

According to an eighth aspect of the disclosure, in an embodiment, there is provided a chip including a processor for calling and executing a computer program in a memory, which causes a device equipped with the chip to implement the above method for transmitting data performed by the network device.

According to a ninth aspect of the disclosure, in an embodiment, there is provided a storage medium, having stored thereon an executable program that, when being executed by a processor, implements the method for transmitting data performed by the terminal device.

According to a tenth aspect of the disclosure, in an embodiment, there is provided a storage medium, having stored thereon an executable program that, when being executed by a processor, implements the method for transmitting data performed by the network device.

According to an eleventh aspect of the disclosure, in an embodiment, there is provided a computer program product including computer program instructions that cause a computer to implement the method for transmitting data performed by the terminal device.

According to a twelfth aspect of the disclosure, in an embodiment, there is provided a computer program product including computer program instructions that cause a computer to implement the method for transmitting data performed by the network device.

According to a thirteenth aspect of the disclosure, in an embodiment, there is provided a computer program that causes a computer to implement the method for transmitting data performed by the terminal device.

According to a fourteenth aspect of the disclosure, in an embodiment, there is provided a computer program that causes a computer to implement the method for transmitting data performed by the network device.

BRIEF DESCRIPTION OF THE DRAWINGS

FIG. 10 is a schematic diagram of another optional processing flow of the method for transmitting data according to the embodiment of the present disclosure.

DETAILED DESCRIPTION

In order to have a more detailed understanding of the features and technical content of the embodiments of the present disclosure, the implementation of the embodiments of the present disclosure will be described in detail below in conjunction with the accompanying drawings, which are provided for illustration only and are not intended to limit the embodiments of the present disclosure.

Before detailed description of embodiments of the present disclosure, artificial intelligence is briefly explained.

Figure 1:
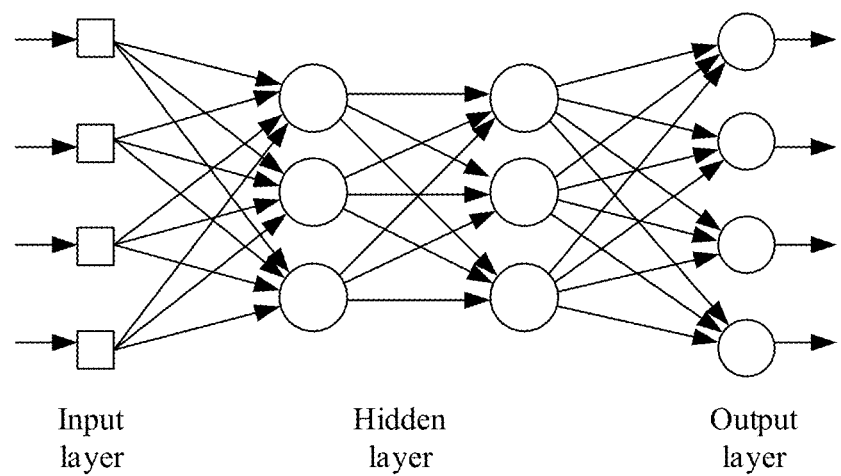
FIG. 1 is a schematic diagram of a basic structure of a simple neural network model of the present disclosure.

Artificial intelligence has become a new way for people to solve and deal with problems. Artificial intelligence based on a neural network has a wide range of applications. The basic structure of a simple neural network model is illustrated in FIG. 1, including: the input layer, the hidden layer and the output layer. The input layer is used to receive data, the hidden layer is used to process data, and the output layer is used to generate the calculation results of the neural network model.

Figure 2:
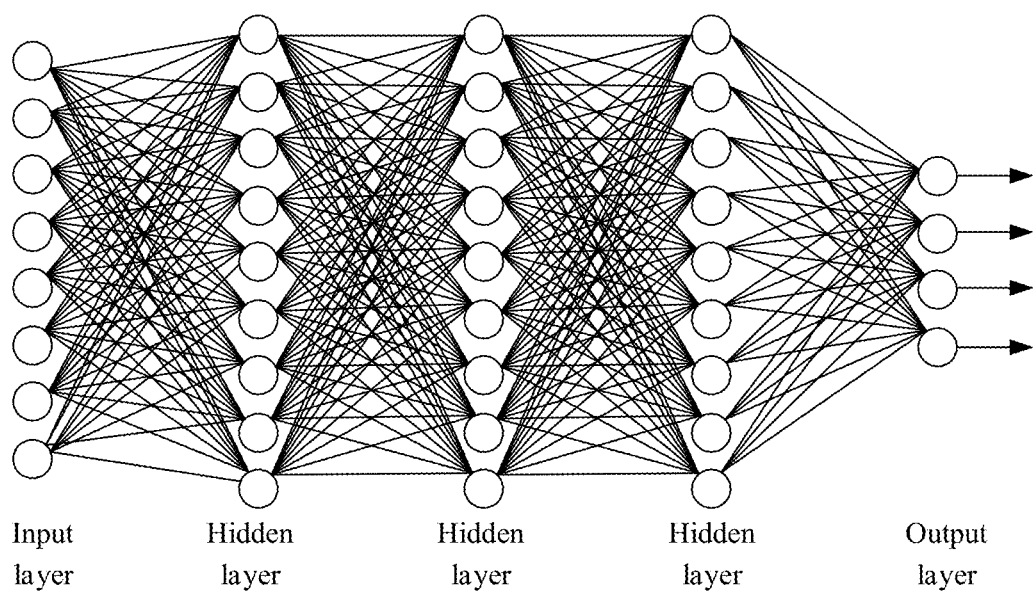
FIG. 2 is a schematic diagram of a basic structure of a deep neural network model of the present disclosure.

With the continuous development of the neural network model research, a neural network deep learning algorithm is proposed. The basic structure of the deep neural network model is illustrated in FIG. 2. The deep neural network model includes multiple hidden layers. The deep neural network model including multiple hidden layers can greatly improve the data processing ability, and is widely used in pattern recognition, signal processing, optimal combination and anomaly detection.

Figure 3A:
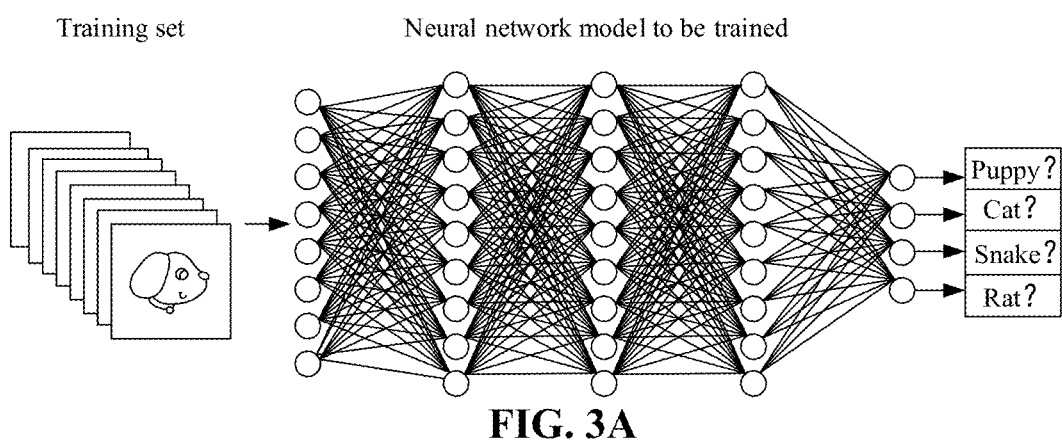
FIG. 3A is a schematic diagram of a training process of a neural network model of the present disclosure.
Figure 3B:
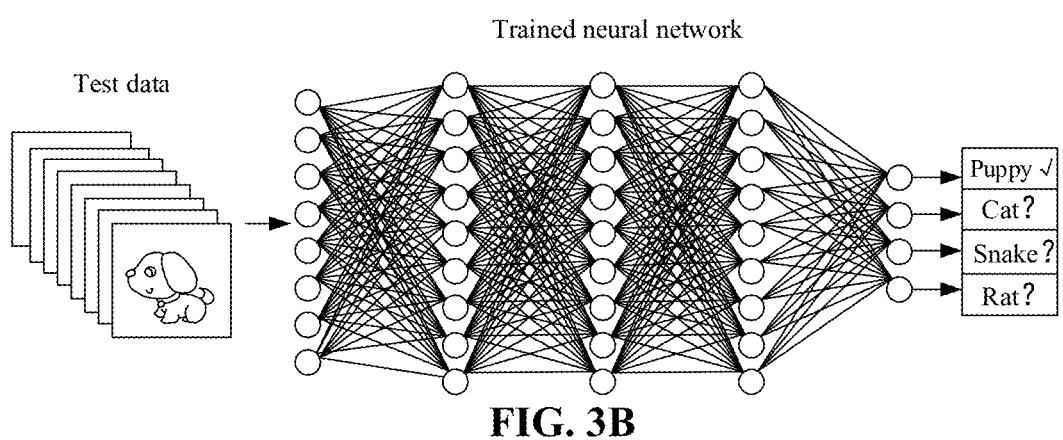
FIG. 3B is a schematic diagram of a reasoning process of the neural network model of the present disclosure.

The application of the neural network model includes two processes of training stage and reasoning stage. In the training stage, a large amount of data first should be obtained as a training set (also called a sample set), the training set is taken as the input data of the neural network model to be trained, and based on a specific training algorithm, through a large number of training and parameter iteration, the parameters to be determined of the neural network model to be trained are determined, thus completing the training process of the neural network model and obtaining a trained neural network model. For example, a neural network model for recognizing a puppy can be trained through a large number of images, as illustrated in FIG. 3A. For a neural network, after the neural network model has been trained, the trained neural network model can be used for reasoning or verification operations such as recognition, classification and information recovery. This process is called the reasoning process of the neural network model. For example, the puppy in the image can be recognized by a trained neural network model, as illustrated in FIG. 3B.

Figure 4:
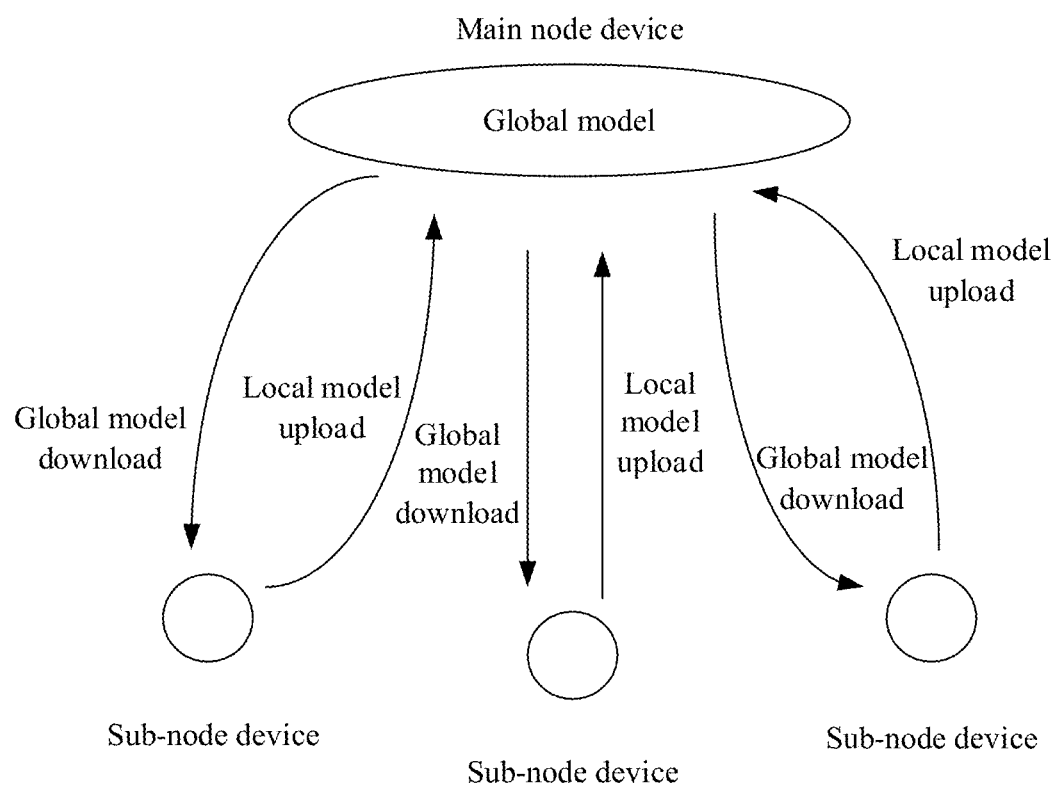
FIG. 4 is a schematic diagram of the training process of the neural network model based on the federated learning of the present disclosure.

A manner of training the neural network model is "federated learning", which is characterized in that during the training process of neural network model, the training sets are distributed on each sub-node device. The training process of the neural network model based on the federated learning is illustrated in FIG. 4, which includes three steps. Firstly, after each sub-node generates a local neural network model, the local neural network model is uploaded to the main node device. Secondly, the main node device can synthesize the current global neural network model according to all the obtained local neural network models, and transmit the global neural network model to each sub-node device. Finally, the sub-node device continues to use the new global neural network model for the next training iteration. Then, the training of neural network model is completed under the cooperation of main node device and multiple sub-node devices.

In the communication system, the terminal device can be regarded as the sub-node device, and the sub-node device transmits specific data to the network device for the network device to achieve the goals of model training, federation learning, system optimization and so on. The specific data may be minimization of drive-test (MDT) measurement data, intermediate data in a federated learning process, sample data in a machine learning process, and data corresponding to a specific Quality of Service (QoS). By automatically collecting and analyzing the measurement reports of the terminal device containing position information, the MDT technology minimizes the workload of manual drive-test and other work. The terminal device transmits the acquired measurement information to the network device, and the network device comprehensively optimizes the network configuration information by using the data from different terminal device.

Services transmitted in the network through data, which is transmitted from multiple terminal devices to the network device, generally has the following characteristics: large amount of data, low time sensitivity, and low user sensitivity, etc. However, when the data having the above characteristics is transmitted by the network device, it is not distinguished from the data transmitting common services such as voice, video and multimedia. In this way, it may lead to potential risks in data transmission, for example, when the current network load is relatively heavy and the resources are insufficient, and a large number of terminal devices transmit data for data collection services to the network device, voice services, video services and multimedia services, which require higher real-time performance of communication systems, will be seriously affected.

The technical solution of the embodiment of the disclosure can be applied to various communication systems. For example, global system of mobile communication (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD) system, advanced long term evolution (LTE-A) system, new radio (NR) system, evolution system of NR system, LTE-based access to unlicensed spectrum (LTE-U) system, NR-based access to unlicensed spectrum (NR-U) system, universal mobile telecommunication system (UMTS), worldwide interoperability for microwave access (WiMAX) communication system, wireless local area network (WLAN), wireless fidelity (WiFi), next generation communication system or other communication systems.

The system architecture and the business scenario described in the embodiment of the disclosure are intended to more clearly illustrate the technical solution of the embodiment of the disclosure and do not constitute a limitation to the technical solution provided by the embodiment of the present disclosure. It is known to those skilled in the art that the technical solution provided by the embodiment of the present disclosure is equally applicable to similar technical problems with the evolution of the network architecture and the emergence of new business scenarios.

The network device in the embodiment of the present disclosure may be a common base station (such as NodeB, eNB or gNB), a new radio controller (NR controller), a centralized unit, a new radio base station, a radio remote module, a micro base station, a relay, a distributed unit, a transmission reception point (TRP), a transmission point (TP) or any other device. The embodiment of the present disclosure is not limited to the specific technology and the specific device form adopted by the network device. For convenience of description, in all embodiments of the present disclosure, the above-mentioned apparatus for providing a wireless communication function for a terminal device is collectively referred to as a network device.

In the embodiments of the present disclosure, the terminal device may be any terminal, for example, the terminal device may be user device for machine-like communication. That is, the terminal device can also be referred to as user equipment (UE), a mobile station (MS), a mobile terminal, a terminal, and the like. The terminal device may communicate with one or more core networks via a radio access network (RAN), for example, the terminal device may be a mobile telephone (or referred to as "cellular" telephone), a computer with a mobile terminal, etc. For example, the terminal device may also be a portable, pocket-sized, hand-held, computer-built or in-vehicle mobile device that exchanges language and/or data with a wireless access network. There is no specific limitation in the embodiments of the present disclosure.

Alternatively, the network device and the terminal device can be deployed on land, including indoor or outdoor, hand-held or vehicle-mounted. It can also be deployed on the water. It can also be deployed on airplanes, balloons and artificial satellites in the air. Embodiments of the present disclosure are not limited to application scenarios of the network device and the terminal device.

Alternatively, communication between a network device and a terminal device, as well as between a terminal device and a terminal device may be carried out through the licensed spectrum, the unlicensed spectrum, or both the licensed spectrum and the unlicensed spectrum simultaneously. Communication between a network device and a terminal device, as well as between a terminal device and a terminal device, can be carried out through frequency spectrum below 7 Gigahertz (GHz), or above 7 GHz, and can also be carried out by using frequency spectrum below 7 GHz and above 7 GHz simultaneously. Embodiments of the present disclosure are not limited to the spectrum resources used between the network device and the terminal device.

Generally speaking, conventional communication systems support a limited number of connections and are easy to implement. However, with the development of communication technology, mobile communication systems will not only support conventional communication, but also support, for example, device to device (D2D) communication, machine to machine (M2M) communication, machine type communication (MTC), vehicle to vehicle (V2V) communication, etc. Embodiments of the present disclosure can also be applied to these communication systems.

Figure 5:
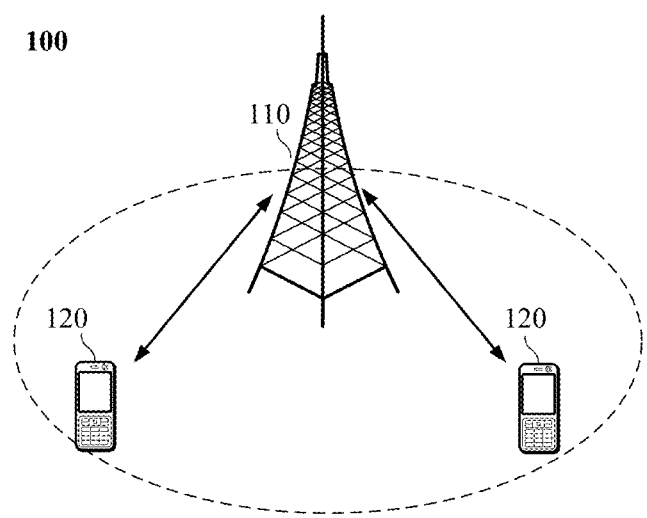
FIG. 5 is a schematic diagram of a composition structure of a communication system according to the embodiment of the present disclosure.

Exemplary, FIG. 5 illustrates the communication system 100 to which the present disclosure embodiment is applied. The communication system 100 may include a network device 110, which may be a device that communicates with a terminal device 120 (or referred to as a communication terminal or terminal). The network device 110 may provide communication coverage for a particular geographic area and may communicate with terminal devices located within the coverage area. Alternatively, the network device 110 may be a base transceiver station (BTS) in a GSM system or a CDMA system, a NodeB (NB) in a WCDMA system, an evolution NodeB (eNB or eNodeB) in an LTE system, or a wireless controller in a cloud radio access network (CRAN), or the network device can be a mobile switching center, relay station, access point, in-vehicle device, wearable device, hub, switch, bridge, router, network-side device in a 5G network or a network device in a future evolved public land mobile network (PLMN), etc.

The communication system 100 also includes at least one terminal device 120 located within the coverage area of the network device 110. "Terminal device" as used herein includes, but is not limited to, a connection via a wire line, such as via a public switched telephone network (PSTN), a digital subscriber line (DSL), a digital cable, a direct cable connection; and/or another data connection/network; and/or via a wireless interface such as a cellular network, a wireless local area network (WLAN), a digital television network such as a DVB-H network, a satellite network, an AM-FM broadcast transmitter; and/or a device of another terminal device arranged to receive/transmit a communication signal; and/or Internet of Things (IoT) devices. A terminal device arranged to communicate through a wireless interface may be referred to as a "wireless communication terminal", "a wireless terminal", or "a mobile terminal". Examples of mobile terminals include but are not limited to satellite or cellular phones; personal communications system (PCS) terminals that can combine cellular radio telephones with data processing, facsimile, and data communication capabilities; personal digital assistant (PDA) that may include radio telephones, pagers, Internet/Intranet access, Web browsers, notebooks, calendars, and/or global positioning system (GPS) receivers; and conventional laptop and/or handheld receivers or other electronic devices including radio telephone transceivers. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular phone, a cordless phone, a session initiation protocol, (SIP) telephone, wireless local loop (WLL) station, PDA, handheld device with wireless communication function, computing device or other processing device connected to wireless modem, in-vehicle device, wearable device, terminal device in 5G network or terminal device in future evolved PLMN, etc.

Alternatively, device to device (D2D) communication may be performed between the terminal devices 120.

Alternatively, the 5G system or 5G network may also be referred to as a new radio (NR) system or an NR network.

FIG. 5 exemplarily illustrates one network device and two terminal devices. Alternatively, the communication system 100 may include multiple network devices and other numbers of terminal devices may be included within the coverage range of each network device, which is not limited by embodiments of the present disclosure.

Alternatively, the communication system 100 may also include other network entities such as network controllers, mobility management entities and the like, which are not limited by embodiments of the present disclosure.

It should be understood that a device having a communication function in a network/system in an embodiment of the present disclosure may be referred to as a communication device. Taking the communication system 100 illustrated in FIG. 5 as an example, the communication device may include a network device 110 and a terminal device 120 having a communication function, the network device 110 and the terminal device 120 may be specific devices described above and will not be described here. The communication device may also include other devices in the communication system 100 such as network controllers, mobility management entities and other network entities, which are not limited in embodiments of the present disclosure.

Figure 6:
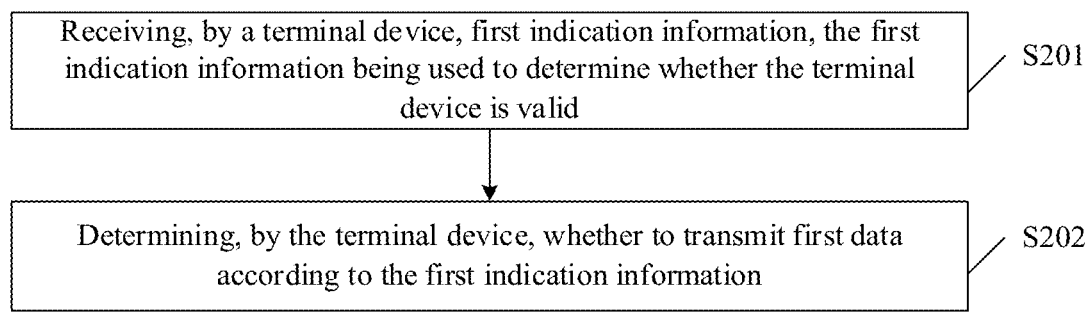
FIG. 6 is a schematic diagram of an optional processing flow of a method for transmitting data according to the embodiment of the present disclosure.

An optional processing flow of the method for transmitting data provided by the embodiment of the present disclosure, as illustrated in FIG. 6, includes the following operations.

At operation S201, a terminal device receives first indication information, the first indication information being used to determine whether the terminal device is valid.

In some embodiments, the terminal device receives the first indication information sent by the network device. The first indication information may be transmitted via broadcast, such as via a master information block (MIB), a system information block (SIB). The first indication information may be transmitted via radio resource control (RRC) signaling, such as an RRC reconfiguration message. The first indication information may also be transmitted by downlink control information (DCI), media access control-control element (MAC CE), physical downlink control channel (PDCCH) signaling, etc.

In response to that the first indication information is used to determine that the terminal device is valid, the terminal device determines to transmit the first data; or in response to that the first indication information is used to determine that the terminal device is invalid, the terminal device determines not to transmit the first data.

In the embodiments of the present disclosure, the first indication information for determining whether the terminal device is valid may include at least the following two manners.

In a first manner, the first indication information includes a first condition for the terminal device to be valid. The first condition includes a probability threshold indicating that the terminal device is valid. The terminal device is valid when a reference value generated by the terminal device between a first value and a second value satisfies a first relationship with the probability threshold. The terminal device is invalid when a reference value generated by the terminal device between a first value and a second value does not satisfy a first relationship with the probability threshold. The first relationship includes any one of the following: the reference value is greater than the probability threshold; the reference value is greater than or equal to the probability threshold; the reference value is less than the probability threshold; and the reference value is less than or equal to the probability threshold. For example, the first indication information includes a probability threshold X, the terminal device generates a reference value between a and b, for example a random number. The terminal device compares the generated reference value with the probability threshold X, and the terminal device is valid when the relationship between the reference value and X satisfies the first condition. The values of a and b may be pre-agreed, or configured by network device.

In the specific implementation, the network device may adjust the threshold X according to its own load state. For example, if the load of the network device is larger, and the first condition is that the reference value is greater than the probability threshold, the terminal device is valid, the network device can set the threshold value X to a larger value. In this way, the number of terminal devices reporting data to the network device can be reduced, and more network resources can be applied to ordinary data service transmission. If the load of the network device is smaller, and the first condition is that the reference value is greater than the probability threshold, the terminal device is valid, the network device can set the threshold value X to a smaller value. In this way, the number of terminal devices reporting data to the network device can be increased, and idle network resources are effectively used to complete data collection services.

In a second manner, bit information included in the first indication information is used to indicate whether the terminal device is valid. Alternatively, the terminal device is valid when the bit information is a third value; the terminal device is invalid when the bit information is a fourth value. For example, the first indication information includes N bits. When the value of the N bits is 1, it indicates that the terminal device is valid, and when the value of the N bits is 0, it indicates that the terminal device is invalid, N being an integer greater than 0.

The first indication information has been described in terms of a transmission mode of the first indication information, a form of the first indication information and the like. In the specific implementation, the first indication information may also be time-sensitive, i.e., when the content indicated by the first indication information becomes valid and when the content becomes invalid after the terminal device has received the first indication information.

In the embodiments of the present disclosure, the timeliness of the first indication information may include at least the following three manners.

In the first manner, the first indication information is valid before the first indication information is updated, or a validity of the terminal device determined according to the first indication information is valid before the first indication information is updated. That is, when the terminal device has received the first indication information, the terminal device may determine whether the terminal device is valid according to the first indication information. Until the terminal device has received the first indication information again, and then the terminal device re-determines whether the terminal device is valid according to the first indication information received again. At this time, the first indication information received by the terminal device again becomes valid and the previous first indication information becomes invalid. For example, when the terminal device has received the first indication information and determines that the terminal device is valid according to the first indication information, the terminal device can transmit the first data. After time T, the terminal device has received the first indication information again, and determines that the terminal device is invalid according to the first indication information, the terminal device cannot transmit the first data.

In the second manner, the first indication information is valid in response to that the second condition is satisfied; or a validity of the terminal device determined according to the first indication information is valid in response to that the second condition is satisfied. Alternatively, the second condition includes at least one of the following: within a first duration after the terminal device has received the first indication information; after the terminal device has received the first indication information, a number of times that the terminal device transmits the first data is less than or equal to a times threshold; or after the terminal device has received the first indication information, a size of the first data transmitted by the terminal device is less than or equal to a data volume threshold. Alternatively, the second condition includes at least one of the following: within a first duration after the terminal device determines whether the terminal device is valid according to the first indication information; after the terminal device determines whether the terminal device is valid according to the first indication information, a number of times that the terminal device transmits the first data is less than or equal to a times threshold; or after the terminal device determines whether the terminal device is valid according to the first indication information, a size of the first data transmitted by the terminal device is less than or equal to a data volume threshold.

After the failure of the second condition, the terminal device needs to re-determine whether the terminal device is valid. The following is an explanation for re-determining whether the terminal device is valid according to different situations.

In some embodiments, if the first indication information includes a first condition for the terminal device to be valid, and the first condition may be a probability threshold indicating that the terminal device is valid, the terminal device may continue to use the first condition included in the first indication information to determine whether the terminal device is valid after the second condition fails. For example, if the second condition is satisfied, the first indication information includes a probability threshold X, the terminal device generates a reference value between a and b, for example a random number, the terminal device compares the generated reference value with the probability threshold X, the terminal device is valid when the reference value is greater than X, and the terminal device is invalid when the reference value is less than or equal to X. After the second condition fails, that is, the terminal device no longer satisfies the second condition, the terminal device regenerates a reference value between a and b, the terminal device compares the generated reference value with the probability threshold X, the terminal device is valid when the reference value is greater than X, and the terminal device is invalid when the reference value is less than or equal to X.

In other embodiments, if the first indication information includes a first condition for the terminal device to be valid, and the first condition may be a probability threshold indicating that the terminal device is valid, the terminal device sends the data request to the network device again after the second condition fails, the network device sends the first indication information again according to the data request sent by the terminal device, and the terminal device determines whether the terminal device is valid according to the first indication information sent again by the network device. A first condition for the terminal device to be valid included in the first indication information sent again by the network device may be different from the first condition for the terminal device to be valid included in the first indication information sent last time. For example, the first indication information sent by the network device last time includes the probability threshold X, and the first indication information sent again by the network device includes the probability threshold Y. For example, if the second condition is satisfied, the first indication information includes a probability threshold X, the terminal device generates a reference value between a and b, for example a random number, the terminal device compares the generated reference value with the probability threshold X, the terminal device is valid when the reference value is greater than X, and the terminal device is invalid when the reference value is less than or equal to X. After the second condition fails, the terminal device generates a reference value between c and d, the terminal device compares the generated reference value with the probability threshold Y, the terminal device is valid when the reference value is greater than Y, and the terminal device is invalid when the reference value is less than or equal to Y.

In other embodiments, if bit information included in the first indication information is used to indicate whether the terminal device is valid, the terminal device sends the data request to the network device again after the second condition fails, the network device sends a first indication information again according to the data request sent by the terminal device to indicate whether the terminal device is valid, and the terminal device determines whether the terminal device is valid according to the first indication information sent again by the network device. The first indication information sent again by the network device may be different from the first indication information sent last time. For example, the first indication information sent last time by the network device indicates that the terminal device is valid, and the first indication information sent again by the network device indicates that the terminal device is invalid.

The second condition is pre-agreed, or the second condition is configured by a network device. Where the second condition is configured by a network device, the second condition may be configured by a broadcast message, such as MIB, or SIB. The second condition may also be configured by dedicated signaling, such as RRC signaling, and RRC reconfiguration messages. The second condition can also be configured by DCI, MAC CE, PDCCH signaling and the like.

For example, if the terminal device has received the first indication information and determines that the terminal device is valid according to bit information included in the first indication information, the terminal device is valid within a first duration after the terminal device determines whether the terminal device is valid according to the first indication information. After the terminal device determines that the terminal device is valid based on the first indication information, if the first duration elapses, the terminal device needs to re-determine whether the terminal device is valid, for example, re-use the first indication information to determine whether the terminal device is valid, or request a new first indication information to determine whether the terminal device is valid. In the specific implementation, if the first indication information includes a first condition for the terminal device to be valid, the first condition may be a probability threshold indicating that the terminal device is valid. After the terminal device transmits data for more than a first duration, the terminal device can re-use the probability threshold value for determining whether the terminal device is valid in the first duration to determine whether the terminal device is valid. The terminal device may also re-send a data request to the network device, and determine whether the terminal device is valid by using the probability threshold value re-sent by the network device.

For another example, the terminal device has received the first indication information, the terminal device determines that the terminal device is valid according to the bit information included in the first indication information, and the terminal device starts transmitting the first data. If a size of the first data transmitted by the terminal device is greater than or equal to the data volume threshold, the validity of the terminal device fails, and the terminal device needs to re-determine the validity of the terminal device. Or, if the number of times that the terminal device transmits the first data is greater than or equal to a times threshold, the validity of the terminal device fails. In the specific implementation, if the first indication information includes a first condition for the terminal device to be valid, the first condition may be a probability threshold indicating that the terminal device is valid. After the first data transmitted exceeds the data volume threshold or the times threshold, the terminal device may re-use the probability threshold of the last use to determine whether the terminal device is valid. The terminal device may also re-send the data request to the network device, and determine whether the terminal device is valid using the probability threshold re-sent by the network device.

In the second manner, if the number of terminal devices is multiple, the validity of the multiple terminal devices is semi-statically updated, giving each terminal device more opportunity to be configured as a valid terminal device.

In a third manner, the first indication information is valid only for one transmission of the first data, or a validity of the terminal device determined according to the first indication information is valid only for one transmission of the first data. For example, the terminal device requests the network device to transmit the first data each time, the network device may respond to the request through the DCI, and the DCI carries the first indication information to indicate whether to allow the transmission of the first data. If the network device indicates that the transmission of the first data is allowed, the terminal device transmits the first data. After the terminal device has transmitted the first data, the first indication information fails. When the first data needs to be transmitted again, the terminal device needs to request the network device to transmit the first data again, and determine whether to transmit the first data according to the first indication information sent by the network device. That is, before each transmission of the first data, the terminal device needs to request the network device to obtain the first indication information, and determine whether the terminal device is valid according to the first indication information, that is, to determine whether the terminal device can transmit the first data.

For another example, if the first indication information includes a first condition for the terminal device to be valid, the first condition may be a probability threshold indicating that the terminal device is valid. Before each transmission of the first data, the terminal device needs to determine whether the terminal device is valid. The terminal device may determine whether the terminal device is valid according to the probability threshold of last use before transmitting the first data each time. The terminal device may also re-send a data request to the network device before each transmission of the first data, and determine whether the terminal device is valid by using a probability threshold of re-sending by the network device.

In the third manner, the validity of the terminal device is dynamically updated. In the specific scenarios, such as a federated learning scenario, a training set data scenario or an MDT scenario, it can maximize the guarantee that the data comes from more samples and ensure the integrity of data information.

At operation S202, the terminal device determines whether to transmit first data according to the first indication information.

In some embodiments, in response to that the terminal device determines that the terminal device is valid according to the first indication information, the terminal device determines to transmit the first data; or in response to that the terminal device determines that the terminal device is invalid according to the first indication information, the terminal device determines not to transmit the first data.

In the embodiments of the present disclosure, the terminal device may be a common terminal device, that is, an arbitrary terminal device. The terminal device also may be a terminal device having a capability to transmit the first data.

In some embodiments, the first data may be at least one of the following: MDT measurement data, intermediate data in a federated learning process, sample data in a machine learning process or data corresponding to a first QoS.

In the specific implementation, data such as training set data in the machine learning and intermediate parameters in the federated learning may be marked as data corresponding to specific QoS when processed in the communication system.

The method for transmitting data provided by the embodiment of the present disclosure is described in detail by taking the first data as MDT data, intermediate data in the federated learning process and sample data in the machine learning process as examples.

The First Embodiment

Using an example in which the first data is MDT data, the terminal device collects MDT data. Before transmitting the MDT data to the network device, the terminal device needs to determine whether the terminal device is valid. If the terminal device determines that it is a valid terminal device, the terminal device transmits the MDT data to the network device.

Figure 7:
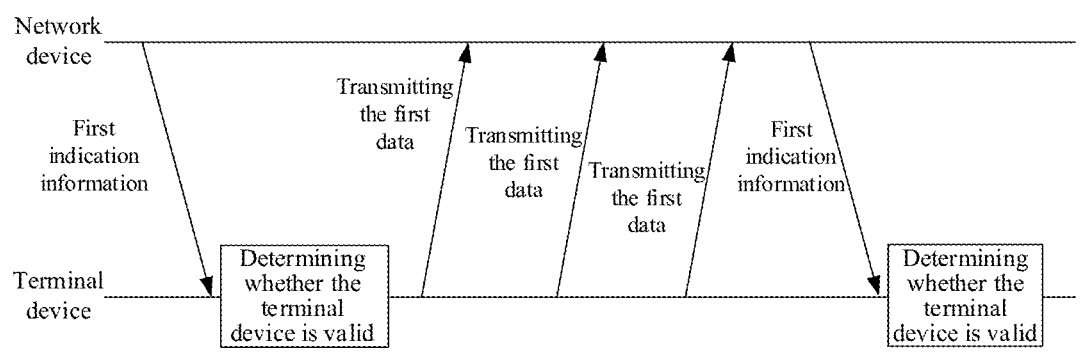
FIG. 7 is a schematic diagram of a detailed optional processing flow of the method for transmitting data according to the embodiment of the present disclosure.

FIG. 7 illustrates a detailed optional processing flow of the method for transmitting data of the embodiment of the present disclosure. The method includes the following operations. A terminal device has received first indication information sent by a network device, and the first indication information includes a first condition for the terminal device to be valid. That is, the terminal device is valid if the first condition is satisfied. For example, the first condition includes a probability threshold X indicating that the terminal device is valid. The terminal device generates a reference value Y between a and b, here a<X<b. If Y is greater than X, the first condition is satisfied, the terminal device is valid, and the terminal device transmits the first data. Until the terminal device has received the new first indication information, the terminal device remains valid, that is, the terminal device can continue to transmit the first data. If the terminal device has received the new first indication information and determines that the terminal device is invalid according to the first indication information, the terminal device cannot transmit the first data again.

The embodiment only uses the example of the first manner of the foregoing manners for determining whether the terminal device is valid for description. In the specific implementation, it is also possible to determine whether the terminal device is valid according to the foregoing second manner.

Similarly, the embodiment only uses the example of the first manner of the foregoing manners for determining the time-sensitive of the first indication information for description. In the specific implementation, it is also possible to determine the time-sensitive of the first indication information according to the second or third manner.

The Second Embodiment

Using an example in which the first data is sample data in the process of machine learning, at least two terminal devices need to transmit the sample data to the network device. Before transmitting the sample data to the network device, the terminal device needs to determine whether the terminal device is valid. If the terminal device determines that it is a valid terminal device, the terminal device transmits the sample data to the network device.

Figure 8:
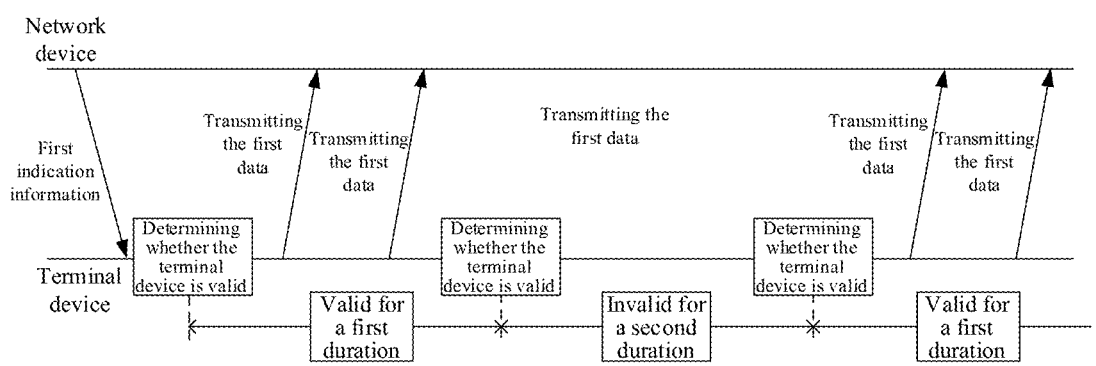
FIG. 8 is a schematic diagram of another detailed optional processing flow of the method for transmitting data according to the embodiment of the present disclosure.

FIG. 8 illustrates another detailed optional processing flow of the method for transmitting data of the embodiment of the present disclosure. The method includes the following operations. A terminal device has received an RRC message sent by a network device, and the RRC message carries first indication information. When the bit value corresponding to the first indication information is 1, it indicates that the terminal device is valid, and the terminal device transmits the first data. The first indication information is valid in response to that the terminal device satisfies the second condition. Taking that the second condition is within the first duration after the terminal device has received the first indication information, the terminal device is valid as an example, if the first duration elapses, the terminal device requests the network device again to send data, and the network device sends the first indication information again to the terminal device. The terminal device needs to determine whether the terminal device is valid again according to the first indication information.

It should be noted that in the embodiment, only using the example in which the second condition is within the first duration after the terminal device has received the first indication information for description. In the specific implementation, the second condition is that a number of times that the terminal device transmits the first data is less than or equal to a times threshold after the terminal device has received the first indication information and that a size of the first data transmitted by the terminal device is less than or equal to a data volume threshold after the terminal device has received the first indication information, which are also applicable to the embodiment.

The embodiment only uses the example of the second manner of the foregoing manners for determining the time-sensitive of the first indication information for description. In the specific implementation, it is also possible to determine the time-sensitive of the first indication information according to the first or third manner.

The Third Embodiment

Using an example in which the first data is the intermediate data in the federated learning process, at least two terminal devices need to transmit the sample data to the network device. Before transmitting the sample data to the network device, the terminal device needs to determine whether the terminal device is valid. If the terminal device determines that it is a valid terminal device, the terminal device transmits the sample data to the network device.

Figure 9:
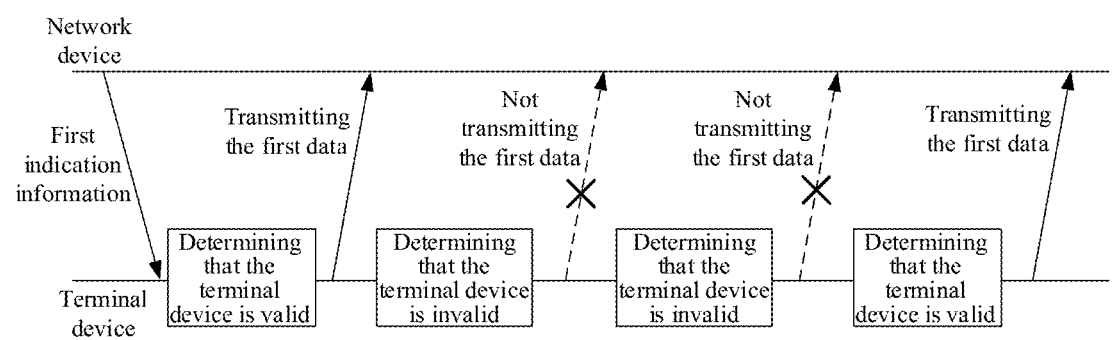
FIG. 9 is a schematic diagram of yet another detailed optional processing flow of the method for transmitting data according to the embodiment of the present disclosure.

FIG. 9 illustrates yet another detailed optional processing flow of the method for transmitting data of the embodiment of the present disclosure. The method includes the following operations. A terminal device has received first indication information sent by a network device, and the first indication information may indicate that the terminal device is valid by the indication manner in the first embodiment or by the indication manner in the second embodiment. In the case that the terminal device determines that the terminal device is valid according to the first indication information, the terminal device performs one transmission of the first data to the network device. In the third embodiment, one first indication information is valid for only one transmission of the first data. When the terminal device needs to send the first data again, the terminal device needs to send the request to the network device again, the network device sends the first indication information to the terminal device again, the terminal device determines whether it is valid according to the first indication information sent again by the network device, then the terminal device determines whether the terminal device can send the first data.

It should be noted that the embodiment only uses the example of the third manner of the foregoing manners for determining the time-sensitive of the first indication information for description in the embodiment. In the specific implementation, it is also possible to determine the time-sensitive of the first indication information according to the first or second manner.

Another optional processing flow of the method for transmitting data provided by the embodiment of the present disclosure, as illustrated in FIG. 10, includes the following operations.

At operation S301, a network device sends first indication information, the first indication information being used to determine whether the terminal device is valid.

In some embodiments, the terminal device may send first data to the network device when the first indication information is used to determine that the terminal device is valid. The terminal device cannot send first data to the network device when the first indication information is used to determine that the terminal device is invalid.

In some embodiments, the first indication information includes: a first condition for the terminal device to be valid. The first condition includes: a probability threshold indicating that the terminal device is valid. The terminal device is valid when a reference value generated by the terminal device between a first value and a second value satisfies a first relationship with the probability threshold. Alternatively, the first relationship includes any one of the following: the reference value is greater than the probability threshold; the reference value is greater than or equal to the probability threshold; the reference value is less than the probability threshold; and the reference value is less than or equal to the probability threshold. The reference value may be a random number.

In other embodiments, bit information included in the first indication information is used to indicate whether the terminal device is valid. Alternatively, the terminal device is valid when the bit information is a third value; the terminal device is invalid when the bit information is a fourth value.

In some embodiments, the first indication information is valid before the first indication information is updated, or a validity of the terminal device determined according to the first indication information is valid before the first indication information is updated.

In other embodiments, the first indication information is valid in response to that the second condition is satisfied; or a validity of the terminal device determined according to the first indication information is valid in response to that the second condition is satisfied. The second condition includes at least one of the following: within a first duration after the terminal device has received the first indication information; after the terminal device has received the first indication information, a number of times that the terminal device transmits the first data is less than or equal to a times threshold; or after the terminal device has received the first indication information, a size of the first data transmitted by the terminal device is less than or equal to a data volume threshold. Alternatively, the second condition includes at least one of the following: within a first duration after the terminal device determines whether the terminal device is valid according to the first indication information; after the terminal device determines whether the terminal device is valid according to the first indication information, a number of times that the terminal device transmits the first data is less than or equal to a times threshold; or after the terminal device determines whether the terminal device is valid according to the first indication information, a size of the first data transmitted by the terminal device is less than or equal to a data volume threshold.

Alternatively, the second condition is configured by the network device; or the second condition is pre-agreed. When the second condition is configured by the network device, the second condition is configured by the network device through a broadcast message; or, the second condition is configured by the network device through dedicated signaling.

In other embodiments, the first indication information is valid only for one transmission of the first data, or a validity of the terminal device determined according to the first indication information is valid only for one transmission of the first data.

In some embodiments, the first data includes at least one of the following: minimization of drive-test (MDT) measurement data, intermediate data in a federated learning process, sample data in a machine learning process or data corresponding to a first quality of service (QoS).

In respective embodiments of the present disclosure, when multiple terminal devices transmit the first data to the network device, the network device may send the first indication information to the terminal device according to the load condition of the network device, the first indication information being used to indicate whether the terminal device sends the first data to the network device. When the load of the network device is large, the network device may indicate a part of the terminal devices to transmit the first data. When the load of the network device is small, the network device may indicate more terminal devices or all of the terminal devices to transmit the first data. In this way, the quality of data transmission can be ensured.

It should be understood that in various embodiments of the present disclosure, the size of the sequence number of the above-mentioned processes does not mean the order of execution, and the execution order of each process should be determined by its function and inherent logic, and should not be limited in any way to the implementation process of the embodiments of the present disclosure.

Figure 11:
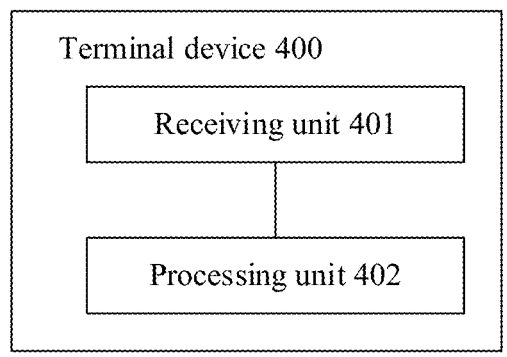
FIG. 11 is a schematic diagram of an optional composition structure of a terminal device according to the embodiment of the present disclosure.

In order to realize the above method for transmitting data, there is provided a terminal device in the embodiment of the present disclosure. An optional composition structure diagram of the terminal device 400 is illustrated in FIG. 11. The terminal device includes a receiving unit 401 and a processing unit 402.

The receiving unit 401 is configured to receive first indication information, the first indication information being used to determine whether the terminal device is valid.

The processing unit 402 is configured to determine whether to transmit first data according to the first indication information.

In some embodiments, the processing unit 402 is configured to determine to transmit the first data in response to that the first indication information is used to determine that the terminal device is valid; or determine not to transmit the first data in response to that the first indication information is used to determine that the terminal device is invalid.

In some embodiments, the first indication information includes: a first condition for the terminal device to be valid.

In some embodiments, the first condition includes: a probability threshold indicating that the terminal device is valid.

In some embodiments, the terminal device is valid when a reference value generated by the terminal device between a first value and a second value satisfies a first relationship with the probability threshold.

In some embodiments, the first relationship includes any one of the following: the reference value is greater than the probability threshold; the reference value is greater than or equal to the probability threshold; the reference value is less than the probability threshold; and the reference value is less than or equal to the probability threshold.

In some embodiments, bit information included in the first indication information is used to indicate whether the terminal device is valid.

In some embodiments, the terminal device is valid when the bit information is a third value; the terminal device is invalid when the bit information is a fourth value.

In some embodiments, the first indication information is valid before the first indication information is updated.

In some embodiments, a validity of the terminal device determined according to the first indication information is valid before the first indication information is updated.

In some embodiments, the first indication information is valid in response to that the second condition is satisfied.

In some embodiments, a validity of the terminal device determined according to the first indication information is valid in response to that the second condition is satisfied.

In some embodiments, the second condition includes at least one of the following:
  within a first duration after the terminal device has received the first indication information;
  after the terminal device has received the first indication information, a number of times that the terminal device transmits the first data is less than or equal to a times threshold; or
  after the terminal device has received the first indication information, a size of the first data transmitted by the terminal device is less than or equal to a data volume threshold.

In some embodiments, the second condition includes at least one of the following:
  within a first duration after the terminal device determines whether the terminal device is valid according to the first indication information;
  after the terminal device determines whether the terminal device device is valid according to the first indication information, a number of times that the terminal device transmits the first data is less than or equal to a times threshold; or after the terminal device determines whether the terminal device is valid according to the first indication information, a size of the first data transmitted by the terminal device is less than or equal to a data volume threshold.

In some embodiments, the second condition is configured by the network device; or the second condition is pre-agreed.

In some embodiments, the second condition is configured by the network device through any one of broadcast messages, RRC signaling, DCI, MAC CE, and PDCCH.

In some embodiments, the first indication information is valid for only one transmission of the first data.

In some embodiments, a validity of the terminal device determined according to the first indication information is valid only for one transmission of the first data.

In some embodiments, the first data includes at least one of the following:

minimization of drive-test (MDT) measurement data, intermediate data in a federated learning process, sample data in a machine learning process or data corresponding to a first quality of service (QoS).

In some embodiments, the terminal device is a terminal device having a capability to transmit the first data.

In some embodiments, the first indication information is carried in any one of: broadcast message, RRC signaling, DCI, MAC CE and PDCCH.

Figure 12:
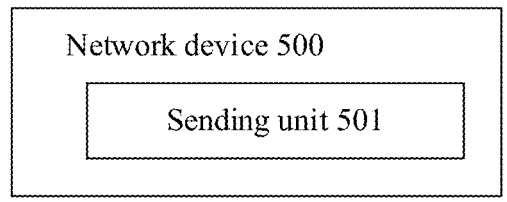
FIG. 12 is a schematic diagram of an optional composition structure of a network device according to the embodiment of the present disclosure.

In order to realize the above method for transmitting, there is provided a network device in the embodiment of the present disclosure. An optional structure diagram of the network device 500 is illustrated in FIG. 12. The network device includes a sending unit 501.

The sending unit 501 is configured to send first indication information, the first indication information being used to determine whether a terminal device is valid.

In some embodiments, in response to that the first indication information is used to determine that the terminal device is valid, the terminal device determines to transmit the first data; or in response to that the first indication information is used to determine that the terminal device is invalid, the terminal device determines not to transmit the first data.

In some embodiments, the first indication information includes: a first condition for the terminal device to be valid.

In some embodiments, the first condition includes: a probability threshold indicating that the terminal device is valid.

In some embodiments, the terminal device is valid when a reference value generated by the terminal device between a first value and a second value satisfies a first relationship with the probability threshold.

In some embodiments, the first relationship includes any one of the following: the reference value is greater than the probability threshold; the reference value is greater than or equal to the probability threshold; the reference value is less than the probability threshold; and the reference value is less than or equal to the probability threshold.

In some embodiments, bit information included in the first indication information is used to indicate whether the terminal device is valid.

In some embodiments, the terminal device is valid when the bit information is a third value; the terminal device is invalid when the bit information is a fourth value.

In some embodiments, the first indication information is valid before the first indication information is updated.

In some embodiments, a validity of the terminal device determined according to the first indication information is valid before the first indication information is updated.

In some embodiments, the first indication information is valid in response to that the second condition is satisfied.

In some embodiments, a validity of the terminal device determined according to the first indication information is valid in response to that the second condition is satisfied.

In some embodiments, the second condition includes at least one of the following:

within a first duration after the terminal device has received the first indication information;

after the terminal device has received the first indication information, a number of times that the terminal device transmits the first data is less than or equal to a times threshold; or after the terminal device has received the first indication information, a size of the first data transmitted by the terminal device is less than or equal to a data volume threshold.

In some embodiments, the second condition includes at least one of the following:

within a first duration after the terminal device determines whether the terminal device is valid according to the first indication information;

after the terminal device determines whether the terminal device is valid according to the first indication information, a number of times that the terminal device transmits the first data is less than or equal to a times threshold; or after the terminal device determines whether the terminal device is valid according to the first indication information, a size of the first data transmitted by the terminal device is less than or equal to a data volume threshold.

In some embodiments, the second condition is configured by the network device; or the second condition is pre-agreed.

In some embodiments, the second condition is configured by the network device through any one of broadcast messages, RRC signaling, DCI, MAC CE, and PDCCH.

In some embodiments, the first indication information is valid for only one transmission of the first data.

In some embodiments, a validity of the terminal device determined according to the first indication information is valid only for one transmission of the first data.

In some embodiments, the first data includes at least one of the following:

minimization of drive-test (MDT) measurement data, intermediate data in a federated learning process, sample data in a machine learning process or data corresponding to a first quality of service (QoS).

In some embodiments, the first indication information is carried in any one of: broadcast message, RRC signaling, DCI, MAC CE and PDCCH.

There is also provided a terminal device in the embodiment of the present disclosure, which includes a processor and a memory for storing a computer program capable of running on the processor. The processor is configured to execute the computer program to implement the operations of the above method for transmitting data performed by the terminal device.

There is also provided a network device in the embodiment of the present disclosure, which includes a processor and a memory for storing a computer program capable of running on the processor. The processor is configured to execute the computer program to implement the operations of the above method for transmitting data performed by the network device.

There is provided a chip in the embodiment of the present disclosure. The chip includes a processor for calling and executing a computer program in a memory, which causes a device equipped with the chip to implement the above method for transmitting data performed by the terminal device.

There is provided a chip in the embodiment of the present disclosure. The chip includes a processor for calling and executing a computer program in a memory, which causes a device equipped with the chip to implement the above method for transmitting data performed by the network device.

There is provided a storage medium in the embodiment of the present disclosure, the storage medium having stored thereon an executable program that, when being executed by a processor, implements the method for transmitting data performed by the terminal device.

There is provided a storage medium in the embodiment of the present disclosure, the storage medium having stored thereon an executable program that, when being executed by a processor, implements the method for transmitting data performed by the network device.

There is provided a computer program product in the embodiment of the present disclosure, the computer program product including computer program instructions that cause a computer to implement the method for transmitting data performed by the terminal device.

There is provided a computer program product in the embodiment of the present disclosure, the computer program product including computer program instructions that cause a computer to implement the method for transmitting data performed by the network device.

There is provided a computer program in the embodiment of the present disclosure, here the computer program causes a computer to implement the method for transmitting data performed by the terminal device.

There is provided a computer program in the embodiment of the present disclosure, here the computer program causes a computer to implement the method for transmitting data performed by the network device.

Figure 13:
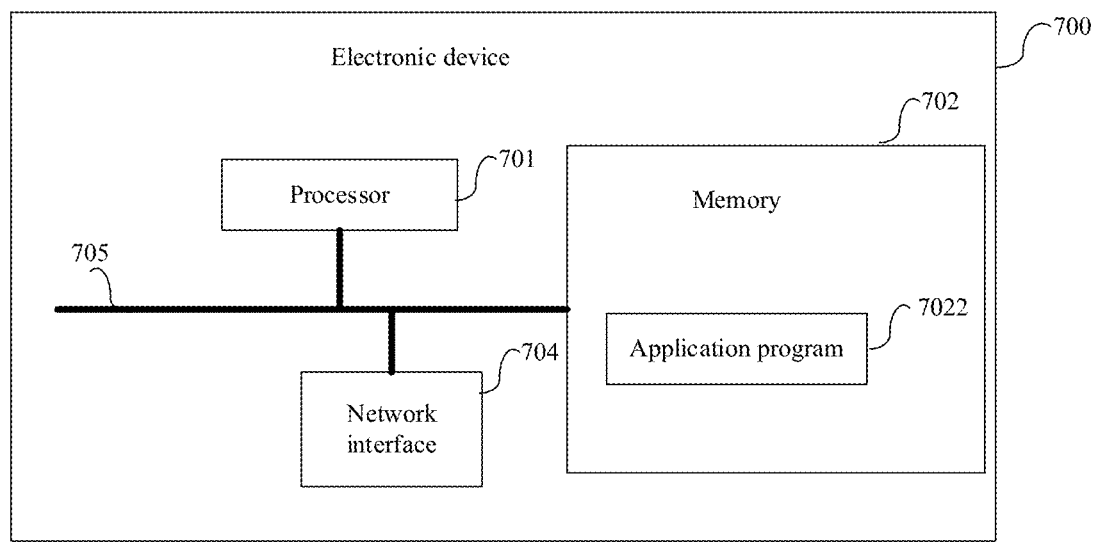
FIG. 13 is a schematic diagram of a hardware composition structure of an electronic device according to the embodiment of the present disclosure.

FIG. 13 is a schematic diagram of a hardware structure of an electronic device (a terminal device or a network device) according to the embodiment of the present disclosure. The electronic device 700 includes at least one processor 701, a memory 702 and at least one network interface 704. The various components in the electronic device 700 are coupled together by a bus system 705. It can be understood that the bus system 705 is used to implement connection communication between these components. The bus system 705 includes a power bus, a control bus and a status signal bus in addition to a data bus. But for clarity, the various buses are designated the bus system 705 in FIG. 13.

It will be understood that the memory 702 may be volatile memory or non-volatile memory, and may also include both volatile and non-volatile memory. The non-volatile memory can be read-only memory (ROM), programmable read-only memory (PROM), erasable programmable read-only memory (EPROM), electrically erasable programmable read-only memory (EEPROM), ferromagnetic random access memory (FRAM), flash memory, magnetic surface memory, optical disk, or compact disc read-only memory (CD-ROM). The magnetic surface memory may be disk storage or magnetic tape memory. The volatile memory may be random access memory (RAM), which serves as an external cache. By way of illustration but not limitation, many forms of RAM are available, for example, static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced synchronous dynamic random access memory (ESDRAM), synclink dynamic random access memory (SLDRAM), direct rambus random access memory (DRRAM). The memory 702 described in embodiments of the present disclosure is intended to include but not limited to these and any other suitable types of memory.

The memory 702 in the embodiments of the present disclosure is used to store various types of data to support the operation of the electronic device 700. Examples of such data include any computer program for operation on the electronic device 700 such as an application program 7022. A program implementing the method of an embodiment of the present disclosure may be included in the application program 7022.

The method disclosed in the above embodiments of the present disclosure may be applied to or implemented by the processor 701. The processor 701 may be an integrated circuit chip having signal processing capability. In implementation, the operations of the above method may be accomplished by integrated logic circuitry of hardware or instructions in the form of software in the processor 701. The processor 701 described above may be a general purpose processor, a digital signal processor (DSP), other programmable logic device, a discrete gate or a transistor logic device, a discrete hardware component or the like. The processor 701 may implement or execute the methods, operations and logic diagrams disclosed in embodiments of the present disclosure. The general purpose processor can be a microprocessor or any conventional processor. The operations of the method disclosed in the embodiment of the application can be directly embodied as the completion of the execution of the hardware decoding processor or the completion of the combined execution of the hardware and software modules in the decoding processor. The software module may be located in a storage medium, the storage medium is located in the memory 702, and the processor 701 reads the information in the memory 702 to complete the operations of the aforementioned method in conjunction with its hardware.

In an exemplary embodiment, the electronic device 700 may be implemented by one or more application specific integrated circuits (ASIC), DSP, programmable logic device (PLD), complex programmable logic device (CPLD), FPGA, general purpose processor, controller, MCU, MPU, or other electronic components for performing the foregoing methods.

The present disclosure is described with reference to flowcharts and/or block diagrams of methods, devices (systems) and computer program products according to embodiments of the present disclosure. It should be understood that each flow and/or block in the flow chart and/or block diagram, as well as combinations of the flow and/or block in the flow chart and/or block diagram, may be implemented by computer program instructions. These computer program instructions may be provided to a processor of a general purpose computer, a special purpose computer, an embedded processor, or other programmable data processing device to generate a machine, such that instructions executed by a processor of a computer or other programmable data processing device generate apparatus for performing the functions specified in one or more flow in the flow chart and/or one or more blocks in the block diagram.

These computer program instructions may also be stored in a computer readable memory that directs a computer or other programmable data processing device to operate in a specific manner, so that the instructions stored in such computer readable memory produce manufactured goods including the instruction device, the instruction device implements the functions specified in one or more flow in the flow chart and/or one or more blocks in the block diagram.

These computer program instructions may also be loaded onto a computer or other programmable data processing device, such that a series of operational steps are executed on a computer or other programmable device to produce a computer-implemented process, such that instructions executed on the computer or other programmable device provide operations for implementing the functions specified in one or more flow in the flow chart and/or one or more blocks in the block diagram.

It should be understood that the terms "system" and "network" in the present disclosure are often used interchangeably herein. In the present disclosure, the term "and/or" is merely an association relationship that describes an associated object and means that there may be three relationships, for example, A and/or B, which may mean that there are three situations: A alone, A and B at the same time, and B alone. In addition, the character "/" in the present disclosure generally means that the associated object is an "or" relationship.

What the above describes are merely preferred embodiments of the disclosure, and are not intended to limit the disclosure. All modifications, replacements and improvements made within the spirit and principles of the disclosure should be included within the scope of protection of the disclosure.

The invention claimed is:

1. A method for transmitting data, comprising:
   receiving, by a terminal device, first indication information, wherein the first indication information is used to determine whether the terminal device is valid; and
   determining, by the terminal device, whether to transmit first data according to the first indication information;
   wherein the first data comprises at least one of: intermediate data in a federated learning process, or sample data in a machine learning process.

2. The method of claim 1, wherein determining, by the terminal device, whether to transmit the first data according to the first indication information comprises:
   in response to that the first indication information is used to determine that the terminal device is valid, determining, by the terminal device, to transmit the first data; or
   in response to that the first indication information is used to determine that the terminal device is invalid, determining, by the terminal device, not to transmit the first data;
   wherein the first indication information comprises: a first condition for the terminal device to be valid.

3. The method of claim 2, wherein the first condition comprises: a probability threshold indicating that the terminal device is valid;
   wherein the terminal device is valid when a reference value generated by the terminal device between a first value and a second value satisfies a first relationship with the probability threshold;
   wherein the first relationship comprises any one of the following:
   the reference value is greater than the probability threshold;
   the reference value is greater than or equal to the probability threshold;
   the reference value is less than the probability threshold; and
   the reference value is less than or equal to the probability threshold.

4. The method of claim 1, wherein bit information comprised in the first indication information is used to indicate whether the terminal device is valid;
   wherein the terminal device is valid when the bit information is a third value;
   the terminal device is invalid when the bit information is a fourth value.

5. The method of claim 1, wherein the first indication information is valid before the first indication information is updated; or
   wherein a validity of the terminal device determined according to the first indication information is valid before the first indication information is updated.

6. The method of claim 1, wherein the first indication information is valid in response to that a second condition is satisfied;
   wherein a validity of the terminal device determined according to the first indication information is valid in response to that the second condition is satisfied.

7. The method of claim 6, wherein the second condition comprises at least one of the following:
   within a first duration after the terminal device has received the first indication information;
   after the terminal device has received the first indication information, a number of times that the terminal device transmits the first data is less than or equal to a times threshold; or
   after the terminal device has received the first indication information, a size of the first data transmitted by the terminal device is less than or equal to a data volume threshold.

8. The method of claim 6, wherein the second condition comprises at least one of the following:
   within a first duration after the terminal device determines whether the terminal device is valid according to the first indication information;
   after the terminal device determines whether the terminal device is valid according to the first indication information, a number of times that the terminal device transmits the first data is less than or equal to a times threshold; or
   after the terminal device determines whether the terminal device is valid according to the first indication information, a size of the first data transmitted by the terminal device is less than or equal to a data volume threshold.

9. The method of claim 6, wherein the second condition is configured by a network device; or
   the second condition is pre-agreed;
   wherein the second condition is configured by the network device through any one of: broadcast message, radio resource control (RRC) signaling, downlink control information (DCI), media access control control element (MAC CE), and physical downlink control channel (PDCCH).

10. The method of claim 1, wherein the first indication information is valid for only one transmission of the first data;
 wherein a validity of the terminal device determined according to the first indication information is valid only for one transmission of the first data.

11. The method of claim 1, wherein the terminal device is a terminal device having a capability to transmit the first data;
 wherein the first indication information is carried in any one of:
 broadcast message, RRC signaling, DCI, MAC CE and PDCCH.

12. A terminal device, comprising a processor, a network interface and a memory for storing a computer program capable of running on the processor, wherein
 the network interface is configured to receive first indication information, wherein the first indication information is used to determine whether the terminal device is valid; and
 the processor is configured to determine whether to transmit first data according to the first indication information;
 wherein the first data comprises at least one of: intermediate data in a federated learning process, or sample data in a machine learning process.

13. The terminal device of claim 12, wherein the processor is configured to determine to transmit the first data in response to that the first indication information is used to determine that the terminal device is valid; or
 determine not to transmit the first data in response to that the first indication information is used to determine that the terminal device is invalid;
 wherein the first indication information comprises: a first condition for the terminal device to be valid.

14. The terminal device of claim 13, wherein the first condition comprises: a probability threshold indicating that the terminal device is valid;
 wherein the terminal device is valid when a reference value generated by the terminal device between a first value and a second value satisfies a first relationship with the probability threshold;
 wherein the first relationship comprises any one of the following:
 the reference value is greater than the probability threshold;
 the reference value is greater than or equal to the probability threshold;
 the reference value is less than the probability threshold; and
 the reference value is less than or equal to the probability threshold.

15. The terminal device of claim 12, wherein bit information comprised in the first indication information is used to indicate whether the terminal device is valid;
 wherein the terminal device is valid when the bit information is a third value;
 the terminal device is invalid when the bit information is a fourth value.

16. The terminal device of claim 12, wherein the first indication information is valid before the first indication information is updated; or
 wherein a validity of the terminal device determined according to the first indication information is valid before the first indication information is updated.

17. The terminal device of claim 12, wherein the first indication information is valid in response to that a second condition is satisfied;
 wherein a validity of the terminal device determined according to the first indication information is valid in response to that the second condition is satisfied.

18. The terminal device of claim 17, wherein the second condition comprises at least one of the following:
 within a first duration after the terminal device has received the first indication information;
 after the terminal device has received the first indication information, a number of times that the terminal device transmits the first data is less than or equal to a times threshold; or
 after the terminal device has received the first indication information, a size of the first data transmitted by the terminal device is less than or equal to a data volume threshold.

19. The terminal device of claim 17, wherein the second condition comprises at least one of the following:
 within a first duration after the terminal device determines whether the terminal device is valid according to the first indication information;
 after the terminal device determines whether the terminal device is valid according to the first indication information, a number of times that the terminal device transmits the first data is less than or equal to a times threshold; or
 after the terminal device determines whether the terminal device is valid according to the first indication information, a size of the first data transmitted by the terminal device is less than or equal to a data volume threshold.

20. A network device, comprising a processor, a network interface and a memory for storing a computer program capable of running on the processor, wherein
 the network interface is configured to send first indication information, wherein the first indication information is used to determine whether a terminal device is valid, to determine whether to transmit first data;
 wherein the first data comprises at least one of: intermediate data in a federated learning process, or sample data in a machine learning process.

* * * * *